United States Patent
Wood

[11] Patent Number: 5,125,331
[45] Date of Patent: Jun. 30, 1992

[54] DEVICE TO CRUSH AND EXTRACT OIL FROM OIL FILTERS

[76] Inventor: Kevin L. Wood, P.O. Box 62, West Linn, Oreg. 97068

[21] Appl. No.: 427,819

[22] Filed: Oct. 27, 1989

[51] Int. Cl.⁵ .............................. B30B 9/06; B30B 9/32
[52] U.S. Cl. ...................................... 100/37; 100/112; 100/126; 100/131; 100/218; 100/246; 100/253; 100/902
[58] Field of Search ................ 100/37, 104, 106, 110, 100/112, 116, 125, 126, 127, 131, 240, 245, 246, 252, 253, 902, 241, 218, 72, 232, 237, 215

[56] References Cited

U.S. PATENT DOCUMENTS

| | | | |
|---|---|---|---|
| 250,979 | 12/1881 | Russel | 100/116 |
| 1,354,528 | 10/1920 | Wertenbruch | 100/127 X |
| 1,641,245 | 9/1927 | Agobian | 100/126 |
| 1,998,263 | 4/1935 | Townsend | 100/902 X |
| 2,587,997 | 3/1952 | Guettler | 100/126 X |
| 2,616,477 | 11/1952 | Scheer et al. | 100/131 |
| 2,737,995 | 3/1956 | Jennings | 100/902 X |
| 3,104,607 | 9/1963 | Galas | 100/902 X |
| 3,228,323 | 1/1966 | Schohl | 100/126 |
| 3,563,168 | 2/1971 | Doninger | 100/215 |
| 3,603,247 | 9/1971 | Price et al. | 100/218 X |
| 3,673,952 | 7/1972 | Durbin, III | 100/126 X |
| 3,828,663 | 8/1974 | Poplinski | 100/218 X |
| 3,980,014 | 9/1976 | McEwen et al. | 100/127 |
| 4,213,386 | 7/1980 | Telling | 100/902 X |
| 4,235,164 | 11/1980 | Allen et al. | 100/127 X |
| 4,249,400 | 2/1981 | Arendt | 100/218 X |
| 4,343,233 | 8/1982 | Burgin | 100/116 |
| 4,459,906 | 7/1984 | Cound et al. | 100/902 X |
| 4,467,715 | 8/1984 | Bunger | 100/218 X |
| 4,771,685 | 9/1988 | Wagner | 100/902 X |
| 4,927,085 | 5/1990 | Oberg | 100/131 X |

FOREIGN PATENT DOCUMENTS

| | | | |
|---|---|---|---|
| 2346147 | 4/1976 | France | 100/902 |
| 329216 | 9/1935 | Italy | 100/126 |
| 62-207600 | 9/1987 | Japan | 100/902 |
| 700792 | 12/1953 | United Kingdom | 100/72 |

Primary Examiner—Harvey C. Hornsby
Assistant Examiner—Stephen F. Gerrity
Attorney, Agent, or Firm—Kolisch, Hartwell, Dickinson, McCormack & Heuser

[57] ABSTRACT

The invented device includes a chamber in which articles to be crushed are placed, a bulkhead at one end of the chamber, a plunger operating in the chamber to compress articles against the bulkhead, a collection area adjacent to the chamber for collecting liquid extracted from the articles and also for collecting the articles after they have been crushed, and a plate that sweeps any liquid and the articles from the collection area into appropriate receptacles.

10 Claims, 2 Drawing Sheets

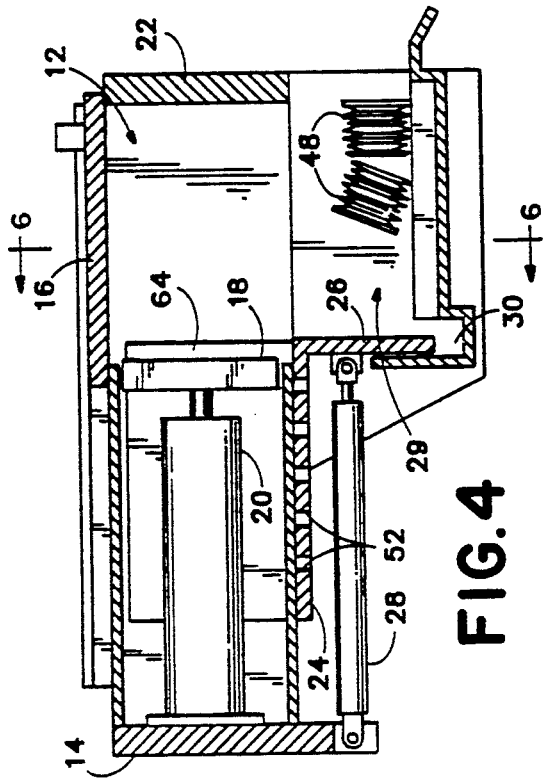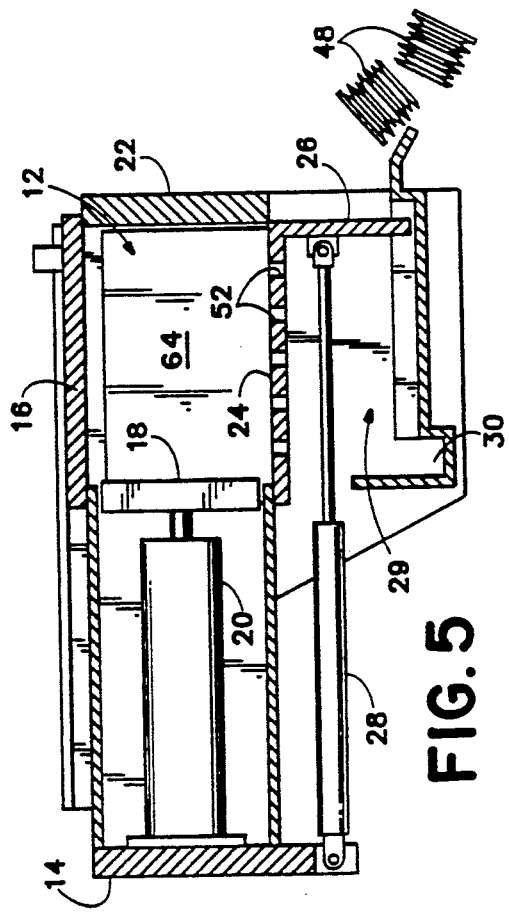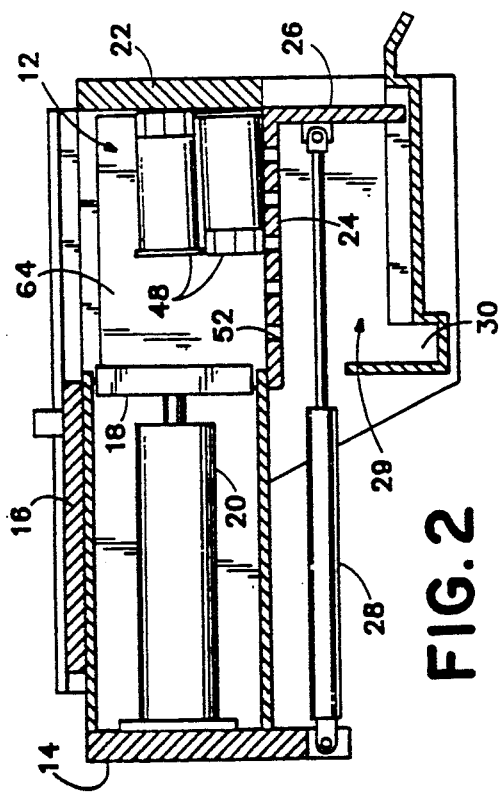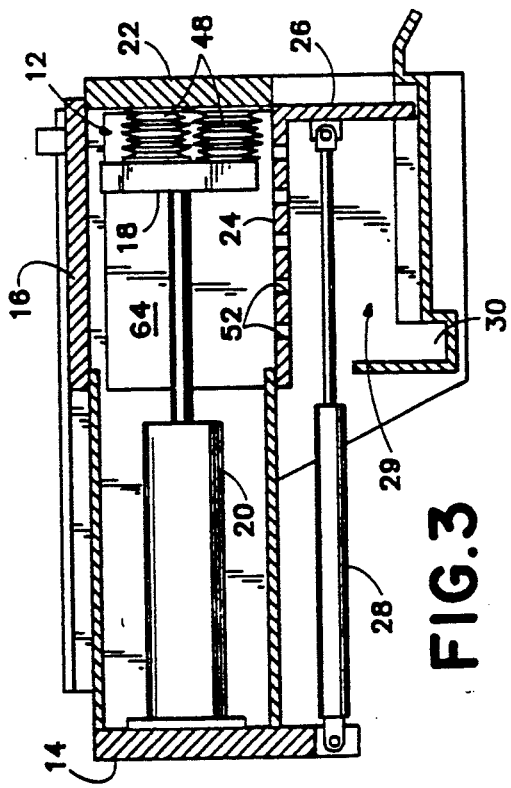

DEVICE TO CRUSH AND EXTRACT OIL FROM OIL FILTERS

TECHNICAL FIELD

This invention relates to a crushing device and, more particularly, to a device capable of crushing and extracting oil from oil filters.

BACKGROUND ART

When automobile and truck oil filter elements are replaced, the used filters are typically disposed of in regional landfills. However, a substantial amount of residual oil is wasted because it remains in the filters and it is also a ground and water pollutant. Furthermore, the filters are bulks and take up a substantial amount of space. The invented device addressed these problems and operates to extract oil and eliminate air space from oil filters.

Previously existing devices that could be used to crush and extract oil from oil filters generally include a plunger that compresses an article against a bulkhead. The bulkhead may form part of a chamber within which the article is crushed. The chamber may also be used to guide the plunger.

Additionally, the chamber of a crushing device may include a floor with an aperture near the bulkhead. When the article is crushed against the bulkhead, its volume is decreased sufficiently so that the article may fall through the aperture. Alternatively, crushing devices have employed floors that reciprocate between an opened and a closed position, allowing a crushed article to fall from the chamber when the floor is open.

Other crushing devices have been designed to allow liquid to be extracted from an article during crushing. However, such devices have had difficulty in directing the extracted liquid to a collection area different from the area receiving the crushed articles.

The invention device extracts liquid from articles while simultaneously crushing the articles. After an article is crushed, the liquid is directed to a collection area and the crushed article is directed to a separate receptacle. When used an oil filters, the invented device recovers trapped oil and eliminates the wasted space within the filters so that they may be disposed of easily.

DISCLOSURE OF THE INVENTION

The invented device includes a chamber in which article to be crushed are placed, a bulkhead at one end of the chamber, a plunger operating in the chamber to compress articles against the bulkhead, a collection area adjacent to the chamber for collecting liquid extracted from the articles and also for collecting the articles after they have been crushed, and a plate that sweeps any liquid and the articles from the collection area into appropriate receptacles.

BRIEF DESCRIPTION OF THE DRAWINGS

FIGS. 2-5 are simplified cross-sectional views, taken along line A—A in FIG. 1, showing successive steps in the operation of the invented device.

DETAILED DESCRIPTION AND BEST MODE FOR CARRYING OUT THE INVENTION

Figure 1:
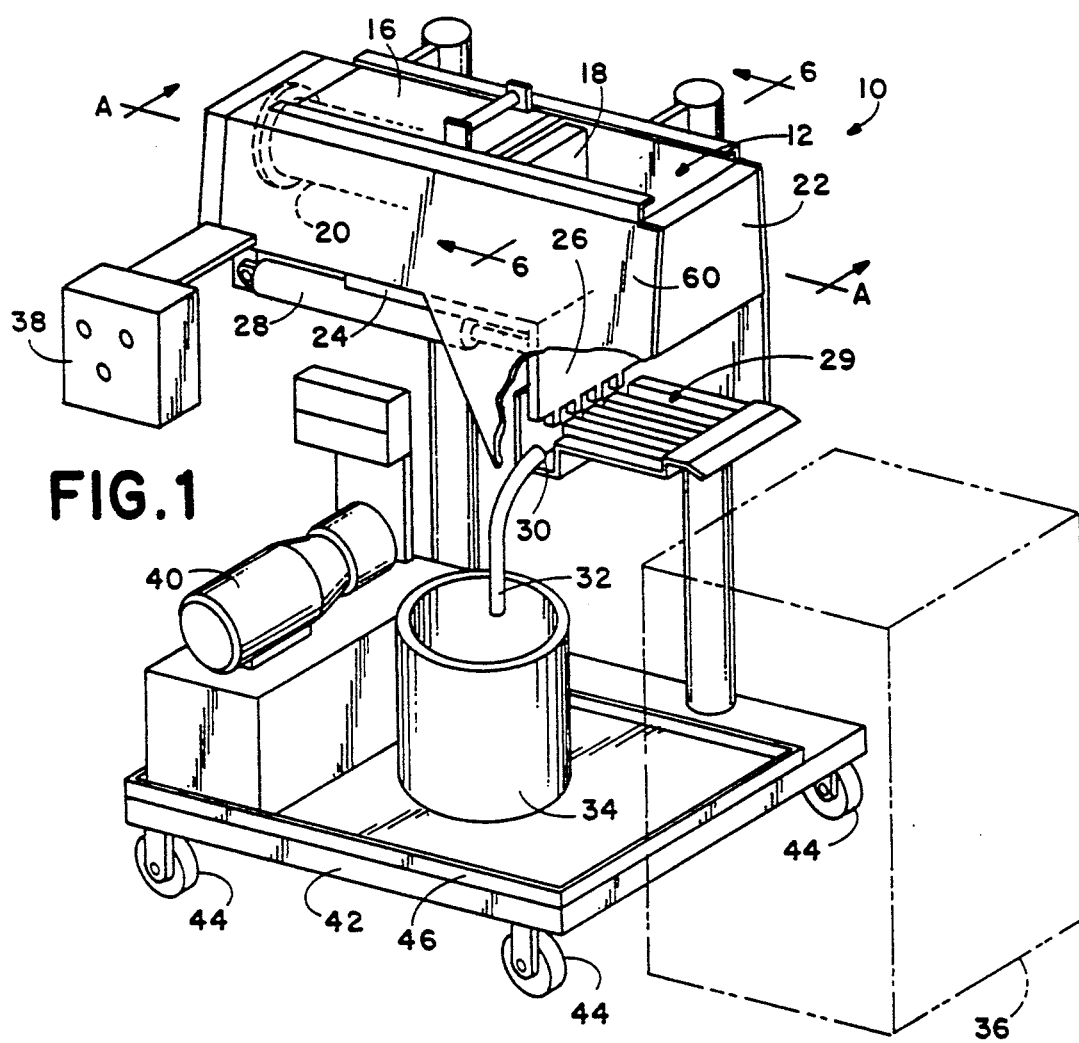
FIG. 1 is a perspective view of a preferred embodiment of the invented device.

A preferred embodiment of the invented device to crush and extract oil from oil filters is shown in FIG. 1 at 10. Device 10 includes a chamber 12 defined by a housing 14, a sliding cover 16 that allows the chamber to be opened and closed, and a bulkhead 22.

Operating within chamber 12 is a crushing means or a reciprocating plunger 18. Plunger 18 may be driven by a standard hydraulic drive, as shown in dashed lines at 20, that is mounted to housing 14. In operation, drive 20 forces plunger 18 toward bulkhead 22. In turn, plunger 18 forces any articles within chamber 12 against bulkhead 22 and crushes them.

Housing 14 also includes a reciprocating floor 24. Floor 24 has at one end a reciprocating plate 26 and both floor 24 and plate 26 are driven by a second hydraulic drive 38 mounted to housing 14. Alternatively, floor 24 and plate 26 may be driven by any means capable of reciprocating them. Drive 28 is used to reciprocate both plate 26 and floor 24 between extended and retracted positions. When drive 28 has reciprocated floor 24 to its extended position, the floor is in what may be referred to as its closed position. Similarly, when retracted, floor 24 may be thought of as being in its open position.

FIG. 1 also shows a collection area 29. When floor 24 is retracted, articles within chamber 12 fall into area 29. As seen in FIGS. 2-5, floor 24 has apertures 52 through which any liquid extracted from the articles may drain into area 29. Alternatively, device 10 may include any liquid collection means for allowing liquid extracted from articles to drain from chamber 12 to area 29. When plate 26 is reciprocated between its retracted and extended positions, it sweeps area 29 and removes the liquid and crushed articles from the area.

Specifically, when plate 26 is retracted, it sweeps any liquid in area 29 into a trough 30. The liquid then drains from trough 30 through a hose 32 into a receptacle 34 (shown in FIG. 1). When plate 26 is extended, any crushed articles in area 29 are swept by plate 26 into a collection bin 36 (shown in dashed lines in FIG. 1). Simultaneously, floor 24 is reciprocated so that it closes chamber 12.

Device 10 can be controlled by any appropriate, known control system. In FIG. 1, an electric control panel 38 is shown. Any standard hydraulic power unit may be employed to operate plungers 20 and 28. In FIG. 1, such a unit is shown at 40. FIG. 1 also shows device 10 mounted to a base 42. Base 42 may either be stationary or mounted on wheels 44. Additionally, base 42 may include a lip 46 to contain any spilled liquid.

FIGS. 2-5 are cross-sectional views, taken along line A—A in FIG. 1, showing the operation of the invented device. Turning to FIG. 2, cover 16 is open and articles 48 have been placed within chamber 12. Additionally, plate 26 is shown in its extended position with floor 24 attached to plate 26. As can be seen, when plate 26 is extended, floor 24 closes chamber 12.

The device then forces plunger 18 toward bulkhead 22 crushing articles 48, as shown in FIG. 3. Any liquid within articles 48 is extracted when the articles are crushed. The liquid then drains through apertures 52 in floor 24 and collects in area 29.

Both plunger 18 and plate 26 are then retracted, as shown in FIG. 4. When plate 26 is retracted, it sweeps across area 29, directing any liquid in the area into trough 30. When plate 26 is retracted, floor 24 is also retracted, allowing articles 48 to fall from chamber 12 into area 29.

Plate 26 is then extended so that floor 24 closes chamber 12, as shown in FIG. 5. When plate 26 is extended, it also sweeps through area 29 and pushes articles 48 out of the area. Because plate 26 sweeps liquid and articles from area 29, it may be referred to as sweep means. Cover 16 may then be opened and additional articles may be placed within chamber 12. The device would then repeat the steps as described.

Items that are crushed in chamber 12 tend to expand radially and thereby occupy more cross-sectional area than before crushing. In some cases, the crushed articles expand radially to such an extent that they do not freely fall from chamber 12 into collection area 29. To resolve this problem, chamber 12 is constructed so that side walls 60 and 62 of chamber 12 slope causing chamber 12 to taper from floor 24 to cover 16, as shown in FIG. 6.

Additionally skirts 64 are attached to floor 24 and extend upwardly from the floor toward cover 16 within chamber 12. When the floor is extended or closed, the cross-sectional dimension of chamber 12 is defined by skirts 64. When plunger 18 and floor 24 retract, skirts 64 also retract and the cross-sectional dimension of chamber 12 increases to the dimension defined by walls 60 and 62. After floor 24 retracts, any articles that were crushed find themselves within a larger area and therefore they are free to fall into area 29.

Figure 6:
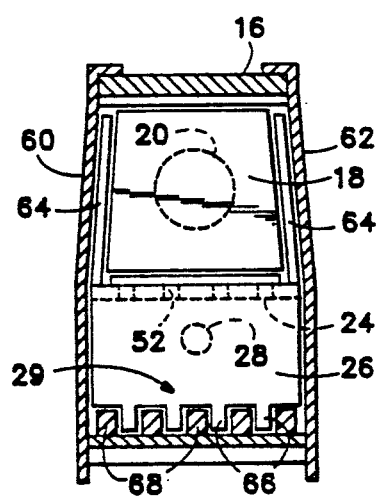
FIG. 6 is a simplified cross-sectional end-view of the invented device's compression chamber and collection area, taken along line 6—6 in FIG. 1.

As can be seen in FIG. 6, plunger 18 operates between skirts 64 and is tapered from bottom to top. Additionally, FIG. 6 shows flanges 66 on plate 26 that interact with ridges 68 in collection area 29 to sweep away liquid.

The invented device may also include a standard activation system that only allows the device to operate when cover 16 is closed and locked. Additionally, the device may include a standard automatic sensor to control the maximum crushing load of plunger 18. The maximum crushing load would be preset and at that load the device can be designed so that both plunger 18, floor 24 and plate 26 all retract automatically. After floor 24 and plate 26 have retracted fully, another sensor can automatically signal them to be extended so that floor 24 closes chamber 12. In this manner, the invented device is virtually automatic.

INDUSTRIAL APPLICABILITY

The invented device is applicable to any situation wherein an article is crushed and liquid is extracted therefrom. The device will reduce the volume of articles to eliminate free air space and will recover liquids extracted from the articles. While the best mode and preferred embodiment of the invention have been described, variations may be made without departing from the spirit of the invention.

I claim:

1. A method of crushing and removing liquid from articles comprising:
   crushing articles within a chamber having a floor capable of reciprocating between extended and retracted positions;
   allowing any liquid extracted from the articles to drain from the chamber to an adjacent collection area below the chamber;
   reciprocating the floor to its retracted position so that articles within the chamber fall into the collection area; and
   sweeping the collection area to direct liquid from the area to a receptacle and to remove articles from the area.

2. A crushing device for removing liquid from articles comprising:
   a chamber, in which articles to be crushed are placed, having a floor capable of reciprocating between extended and retracted positions;
   crushing means, operating in the chamber, for compressing any articles therein;
   a collection area adjacent to the chamber;
   means for reciprocating the floor to its retracted position to allow articles to fall from the chamber into the collection area;
   liquid collection means for allowing any liquid extracted from the articles to drain from the chamber to the collection area;
   a receptacle for receiving the liquid extracted from the articles; and
   sweep means for sweeping liquid from the collection area and directing it to the receptacle and for removing articles from the collection area.

3. The device of claim 2 wherein the liquid collection means includes apertures in the floor.

4. The device of claim 2 wherein the chamber includes a bulkhead and the crushing means includes a reciprocating plunger that compresses the articles against the bulkhead.

5. The device of claim 2 wherein the sweep means includes a reciprocating plate that sweeps across the collection area.

6. The device of claim 2 wherein the sweep means includes a reciprocating plate that sweeps across the collection area, and the reciprocating floor is connected to the plate so that when the floor is reciprocated, the plate is also reciprocated.

7. A crushing device comprising:
   a chamber in which articles are crushed having a floor and opposed sides defining a void region above the floor, the floor being capable of reciprocating between extended and retracted positions;
   a collection area adjacent to the chamber;
   means for reciprocating the floor to its retracted position to allow articles to fall from the chamber into the collection area;
   at least one moveable skirt reciprocable in the void region between an extended position inside the chamber and a retracted position outside the chamber, where the skirt, when it is in its extended position, substantially overlaps and extends along one of the chambers sides to decrease the side-to-side dimension of the void region; and
   crushing means operating in the chamber, for compressing any articles therein.

8. The device of claim 7 wherein the skirt is connected to the floor.

9. A crushing device comprising:
   a chamber in which articles to be crushed are placed having a floor movable between open and closed positions;
   crushing means operating in the chamber with the floor in its closed position for compression any articles therein;
   a collection area adjacent to the chamber;
   means for moving the floor to its open position to allow articles to fall from the chamber collection area; and a reciprocating plate in the collection area attached to the floor for removing articles from the collection area.

10. A crushing device comprising:

a chamber in which articles to be crushed are placed having a floor capable of reciprocating between extended and retracted positions;

crushing means, operating in the chamber, for compressing any articles therein;

a collection area adjacent to the chamber;

means for reciprocating the floor to its retracted position to allow articles to fall from the chamber into the collection area; and a reciprocating plate in the collection area attached to the reciprocating floor for removing articles from the collection area.

* * * * *